June 29, 1937. H. WOLLNER 2,085,284
DUST COVER
Filed May 25, 1936
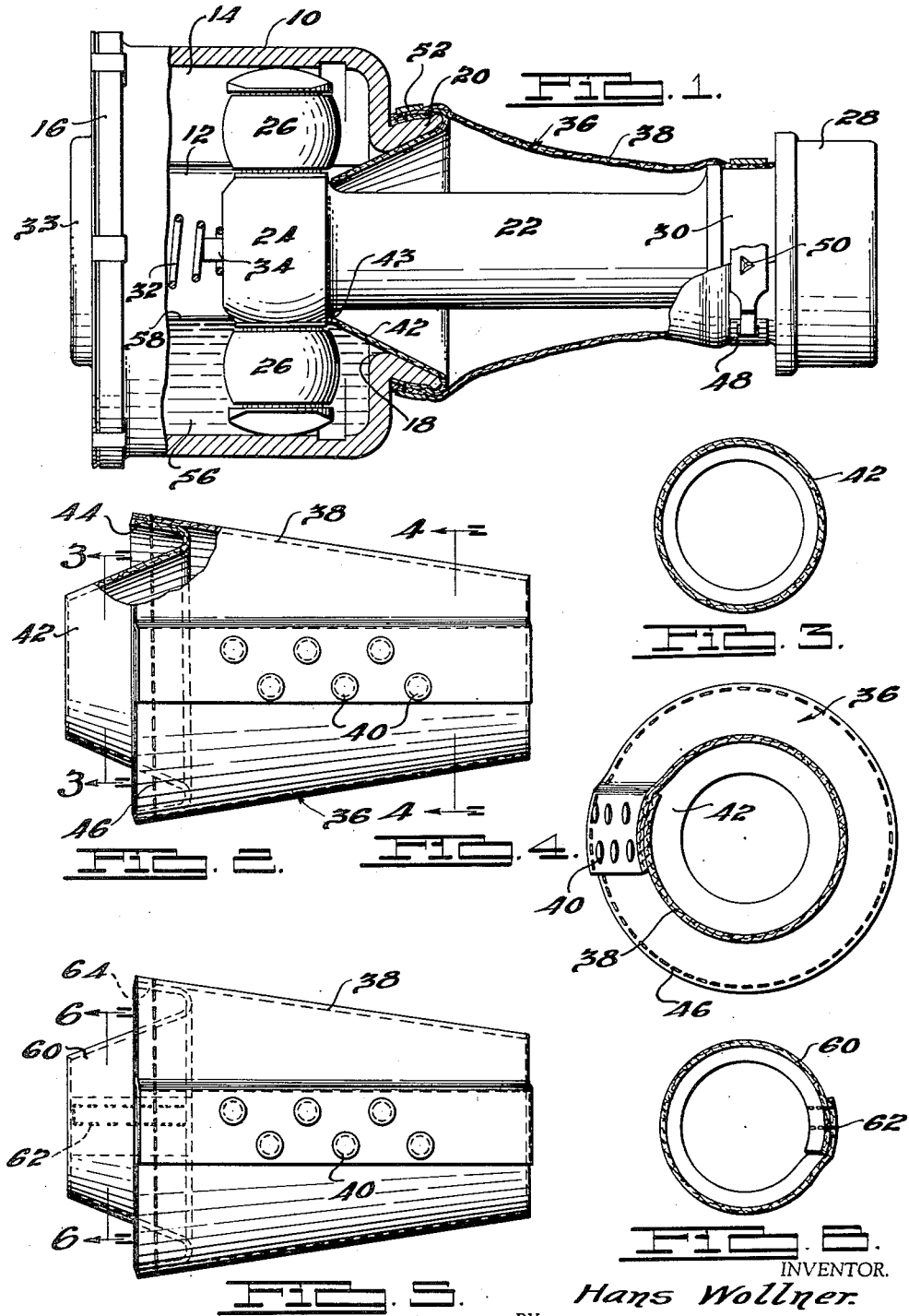
INVENTOR.
Hans Wollner.
BY Harness, Dickey, Pierce & Hann.
ATTORNEYS.

Patented June 29, 1937

2,085,284

UNITED STATES PATENT OFFICE 2,085,284

DUST COVER

Hans Wollner, Detroit, Mich., assignor to Universal Products Company, Inc., Dearborn, Mich., a corporation of Delaware Application May 25, 1936, Serial No. 81,633

4 Claims. (Cl. 64—32)

This invention relates to universal joints and more particularly relates to boots for universal joints.

An object of the invention is to provide a boot for joint structures of such a construction that it will prevent escape of lubricant from the joint housing and will also prevent entrance of foreign matter, such as dust, dirt and water, into the housing.

Other objects of the invention are to provide a boot for universal joints which will permit initial charging of the housing with considerably more lubricant than has been possible in prior constructions and, therefore, make it unnecessary to add lubricant after the initial charging during the life of the joint.

Another object of the present invention is to provide a boot on a universal joint with a relatively stiff portion which projects into the joint housing and traps the lubricant therein and with a relatively flexible portion which encloses the shaft of the joint, acts as a dust cover, and permits axial and universal movement of the shaft and housing relative to each other.

Another object of the invention is to provide boots for universal joints which are economical to manufacture, easy to assemble, and durable and efficient in operation.

In prior universal joint constructions in which boots have been used and in which a shaft projects into the universal joint housing through an opening provided therein and which is universally and axially movable in driving relation to the housing, the difficulty is that the lubricant contained within the housing escapes through the opening along the length of the shaft and collects within the boot. When the joint is brought to rest the lubricant collected in the boot settles to the bottom of the boot; and when rotation of the joint is again started the lubricant collected within the boot, offset from the center line of the shaft, creates an unbalanced operating condition which is particularly noticeable and objectionable at high speeds of operation. Besides creating this undesirable operating condition, the escape of lubricant from the housing to within the boot is also objectionable in that the lubricant is no longer present for lubricating purposes, and it becomes necessary to frequently recharge the joint housing with the additional lubricant necessary for proper operation.

With the construction of the present invention the housing may be initially charged with an amount of lubricant greater than has been possible in prior constructions and, by preventing the escape of the lubricant from the housing, the initial charge is sufficient throughout the life of the joint and supplemental charges of lubricant are unnecessary. Also in the construction of the present invention the lubricant will not escape to within the boot and the undesirable, unbalanced operating conditions of prior constructions are eliminated.

Other objects and advantages of the invention will become apparent from the following specification, the drawing relating thereto and from the claims hereinafter set forth.

In the drawing, in which like numerals are used to designate like parts in the several views throughout:

Fig. 1 is a longitudinal, elevational view with parts broken away showing parts in section of a universal joint construction having mounted thereon a boot constructed according to one form of the invention.

Fig. 2 is a longitudinal, elevational view with a part broken away, showing parts in section, of the boot construction illustrated in Fig. 1;

Fig. 3 is an elevational, sectional view taken substantially along the line 3—3 of Fig. 2;

Fig. 4 is an elevational, sectional view taken substantially along the line 4—4 of Fig. 2;

Fig. 5 is a longitudinal, elevational view of a modified boot construction;

Fig. 6 is an elevational, sectional view taken substantially along the line 6—6 of Fig. 5.

Referring to Fig. 1, a universal joint housing 10 is provided with a central cylindrical bore 12 therein extending longitudinally thereof, and cylindrical guides 14 on opposite sides of the central bore 12, parallel thereto and opening thereinto throughout their length. A cover plate 16 closes one end of the housing normal to the axes of the longitudinal guides. An opening 18 is provided in the housing substantially at the center of the end opposite to the plate 16 and has an outwardly diverging annular flange 20 around the periphery of the opening, through which a shaft member 22 projects.

The inner end of the shaft member 22 is within the housing and terminates in a ball head 24 which has clearance with the sides of the central bore 12. The ball head is drilled normal to the longitudinal axis of the shaft 22 and is provided with a pin press fitted therein, the opposite ends of which protrude from the ball head to provide trunnions upon which are journaled truncated bearing members or balls 26 which operatively engage the trunnions and are longitudinally slidable in the guides 14. The joint illustrated is of the type more fully shown in the Warner Patent No. 1,921,274.

The shaft 22 extends through the opening 18 and the opposite, enlarged, outer end 28 is adapted to telescope with a tubular drive shaft and be welded thereto. Between the outer end 28 and the smaller diametered main portion of the shaft 22 a sloping recessed shoulder 30 is provided which extends around the periphery of the shaft member and forms a seat for one end of a boot, as will be described in further detail.

A helical spiral spring 32 has its large end seated within a central recess 33 of the plate 16 and its small end engages the inner face of the end 24 of the shaft and is secured against lateral displacement relative to the shaft by means of a boss 34 which is loosely surrounded by the terminating coil of the spring.

In Fig. 1 the shaft member is illustrated in a slightly forward position axially of the housing with the axis of the shaft in substantial alignment with the longitudinal axis of the housing. It is evident from the foregoing description that the joint housing and shaft member are universally and axially movable and in driving relation with respect to each other.

In order to prevent the escape of lubricant from the housing and to prevent foreign material from entering the housing, a double boot generally indicated at 36 connecting the shaft and housing and enclosing the housing opening, is provided. The double boot 36 comprises an elongated, main outer boot portion 38 which is formed of a flexible leather sheet member having its longitudinal edges overlapping throughout their lengths and secured together by means of rivets 40. The outer boot portion 38 is substantially frusto-conical in shape and has secured to its base edge an inner boot member 42 which is substantially frusto-conical in shape with an opening 43 at its small end, and has a reversely bent peripheral flange 44 adjacent its base, which is secured to the body portion 38 by means of stitching 46. The inner boot 42 is in substantial alignment with the normal longitudinal axis of the outer boot portion and converges toward this axis extending in a direction opposite to that of the body portion. The inner boot 42 is relatively stiff compared to the body portion 38 and is formed by moulding leather to the shape described and, therefore, has smooth, continuous inner and outer surfaces.

In its assembled position as shown in Fig. 1, the small end of the boot 36 is attached to the shaft member 22 on the shoulder 30 at the outer end of the main body portion 38 by means of a metal clamping strip 48 which extends around the engaging portion of the boot and is provided with cooperating tongue and slot connections at its ends to pull the strip tightly toward the shoulder 30 and hold the boot 38 in place. The strip 48 is provided with punched-in portions 50 at spaced intervals around its periphery which bite into the leather boot and prevent the marginal edge of the boot from slipping out from under the strip 48 when subjected to strain.

The boot 36 is in surrounding relation to the shaft member 22 extending longitudinally thereof and has the large end of the outer boot member telescoped over the flange 20. The marginal edge of the reversely bent annular portion 44 of the inner boot 42 fits within the marginal edge of the outer boot 38, and both are clamped to the flange 20 by means of a metal strap 52 which securely pulls the engaging portion of the boot against the flange and is similar in construction to the strap 48 described above, the flange 20 engaging an annular recess in the boot formed by the inner boot 42 at its base and the reversely bent annular portion 44.

The member 42 engages the inner face of the flange 20 and projects through the opening 18 into the housing 10, converging toward the shaft member 22. The opening 43 in the small end of the inner boot 42 is originally smaller than the ball head 24 and is stretched when it is slipped over the ball head in assembling the boot and shaft member. When in assembled position behind the ball head, the inner boot resets, and the opening returns to its original size so that the inner marginal edge of the inner boot at the opening 43 terminates in close proximity to the shaft 22. When the joint is rotated the lubricant within the housing will be distributed over the inner surface of the housing; and when the joint is brought to rest the lubricant will settle to the bottom of the housing, being directed away from the opening in flowing over that part of the member 42 which is within the housing.

As indicated in Fig. 1, the interior of the housing 10 is charged with a lubricant 56 which assumes a level as indicated at 58 when the joint is at rest. It can be seen that the level 58 of the lubricant is substantially above the lowermost edge of the opening 18 and may extend to a height slightly below the lower, innermost edge of the member 42 within the housing. The member 42 will effectively prevent escape of the lubricant from the housing either while the joint is in rotation or at rest.

The main body member 38 will prevent the entrance of dust or other foreign material into the joint housing and, being flexible, will permit relative universal and axial movement between the shaft member 22 and the housing 10.

In Figs. 5 and 6, a modified form of boot is shown in which the outer boot portion 38 is similar in construction to the outer boot portion 38 of the previously described embodiment, the inner boot 60 being secured to the body member 38 in a manner similar to that described in the previous embodiment. But in this modification the inner boot 60 is formed of a relatively flexible, leather sheet member which has its edges overlapped and secured together by means of stitching 62. The inner boot 60 is substantially frusto-conical in shape and at its base is bent back as indicated at 64 to form a reversely bent, annular flange portion around the edge of the base, the flange portion then being secured to the base of the main body portion 38 by means of stitching. When in assembled position on the universal joint, the inner boot 60 projects into the housing in a manner similar to that described in regard to the previous embodiment. The inner boot 60 is preferably stiffened by impregnating it with a suitable material such as paraffin.

Formal changes may be made in the specific embodiments of the invention described without departing from the spirit and substance of the broad invention, the scope of which is commensurate with the appended claims.

What I claim is:

1. As an article of manufacture a non-metallic boot for a universal joint comprising an elongated, substantially frusto-conical flexible body member, and an additional substantially frusto-conical relatively stiff member having a portion at its base engaging the base of said body member, the longitudinal axis of said members being normally in alignment, and said members converging toward said axis in oppositely extending directions.

2. As an article of manufacture a non-metallic boot for a universal joint comprising an elongated flexible body portion split longitudinally, the edges being overlapped and secured together along the length thereof, said body portion being substantially circular in cross-section, and a substantially frusto-conical relatively stiff member having a reversely bent peripheral flange portion adjacent the base thereof secured to one end of said body portion, said member being in substantial alignment with the longitudinal axis of said body portion, converging toward said axis and extending in a direction opposite to that of said body portion.

3. In combination, a universal joint including a housing having an opening therein, an outwardly diverging annular flange adjacent said opening, and a shaft extending into said housing through said opening in spaced relation thereto, said housing and said shaft being universally and axially movable and in driving relation with respect to each other, and a unitary non-metallic boot having a flexible outer portion connected to said shaft and to said flange and enclosing a substantial portion of said shaft and said opening, and a relatively stiff inner portion engaging said flange and extending into said housing through said opening in surrounding relation to said shaft and terminating in close proximity to said shaft.

4. In a universal joint construction, a housing having an opening in one end thereof, an outwardly diverging annular flange adjacent said opening, a shaft having one end extending into said housing through said opening in spaced relation thereto, and a unitary non-metallic boot having a substantially frusto-conical flexible portion connected to said flange at the base of said portion and engaging said shaft at the other end of said portion, and having another substantially frusto-conical portion having a reversely bent portion, said reversely bent portion providing an annular recess receiving therein said outwardly diverging annular flange, the main frusto-conical portion engaging the inner surface of the outwardly diverging flange and extending into said housing in surrounding relation to said shaft and terminating in close proximity thereto.

HANS WOLLNER.